United States Patent [19]

Farr

[11] Patent Number: 5,493,122
[45] Date of Patent: Feb. 20, 1996

[54] ENERGY RESOLVING X-RAY DETECTOR

[75] Inventor: William H. Farr, Monrovia, Calif.

[73] Assignee: Nucleonics Development Company, Monrovia, Calif.

[21] Appl. No.: 192,001

[22] Filed: Feb. 4, 1994

[51] Int. Cl.$^6$ ..................................................... G01T 1/36
[52] U.S. Cl. ................ 250/370.06; 250/370.01; 378/50
[58] Field of Search ............... 250/370.01, 370.06, 250/370.09; 378/44, 50, 98.8, 99

[56] References Cited

U.S. PATENT DOCUMENTS

| | | |
|---|---|---|
| 4,472,728 | 9/1984 | Grant et al. |
| 4,609,823 | 9/1986 | Berger et al. ............... 250/370.09 |
| 4,692,626 | 9/1987 | Westphal ............... 250/370.06 X |
| 4,885,620 | 12/1989 | Kemmer et al. |
| 4,950,906 | 8/1990 | Beerlage ............... 250/370.06 X |
| 5,029,337 | 7/1991 | Mackenzie et al. ............... 378/44 X |
| 5,138,642 | 8/1992 | McCroskey et al. |
| 5,140,162 | 8/1992 | Stettner |
| 5,142,557 | 8/1992 | Toker et al. ............... 378/37 |
| 5,235,402 | 8/1993 | Prytherch ............... 356/326 |

OTHER PUBLICATIONS

"Large Format, High Resolution Image Sensors" by M. Blouke et al., Optical Engineering, vol. 26, No. 9, pp. 837–844; Sep. 1987.

"The Potential of CCDs for UV and X-Ray Plasma Diagnostics" by J. Janesick et al. Review of Scientific Instruments; 18 pp.; Sep. 15, 1984.

"Charge Transfer Efficiency Measurements at Low Signal Levels on STIS/SOHO TK1024 CCD's" by J. Orbock et al.; SPIE vol. 1242 pp. 105–116; 1990.

"Performance Tests of Large CCDs" by L. Robinson et al.; SPIE vol. 1447; pp. 214–228; 1991.

"Present and Future CCDs for UV and X-Ray Scientific Measurements" by J. Janesick et al.; IEEE Transactions NS-32; No. 1, 409; pp. 1–8; 1985.

"Evaluation of a Virtual Phase Charged-Coupled Device as an Imaging X-ray Spectrometer" R. Stern et al.; Rev. Sci. Instrum. vol. 54; No. 2; Feb. 1983.

"CCD Charge Collection Efficiency and the Photon Transfer Technique" by J. Janesick et al; SPIE Preprint; pp. 1–13; 1985.

"Backside Charging of the CCD" by J. Janesick et al.; SPIE Preprint; pp. 1–34; no date.

Primary Examiner—Carolyn E. Fields
Assistant Examiner—Edward J. Glick
Attorney, Agent, or Firm—Sheldon & Mak

[57] ABSTRACT

An energy-resolving x-ray detector for soft x-rays produced by elements having atomic numbers ranging from 9 to 23 includes a charge-coupled integrated circuit radiation detector device having an array of collection regions in a parallel plurality of collection shift registers forming columns of the array; an output amplifier for sequentially amplifying and signalling the charges received by the collection shift register; and a row shift register connected between the collection shift registers and the output amplifier; and a clock circuit having a multi-phase column output connected for sequentially shifting charges between collection regions of the collection shift register and into the row shift register during continuous exposure of the array to incoming radiation, each of the charges received by the output amplifier being sequentially accumulated in each of the collection regions of one collection shift register in response to the radiation, the clock circuit also having a multi-phase row output connected for sequentially shifting the charges from the row shift register to the output amplifier, the output amplifier having a reset connection to the clock circuit for momentarily resetting the input to the output amplifier at a predetermined level prior to receipt of each of the charges into the output amplifier. The output amplifier feeds an analog signal chain providing correlated double sampling. A spectrometer and thickness measurement apparatus suitable for monitoring silicone coatings includes the detector.

24 Claims, 6 Drawing Sheets

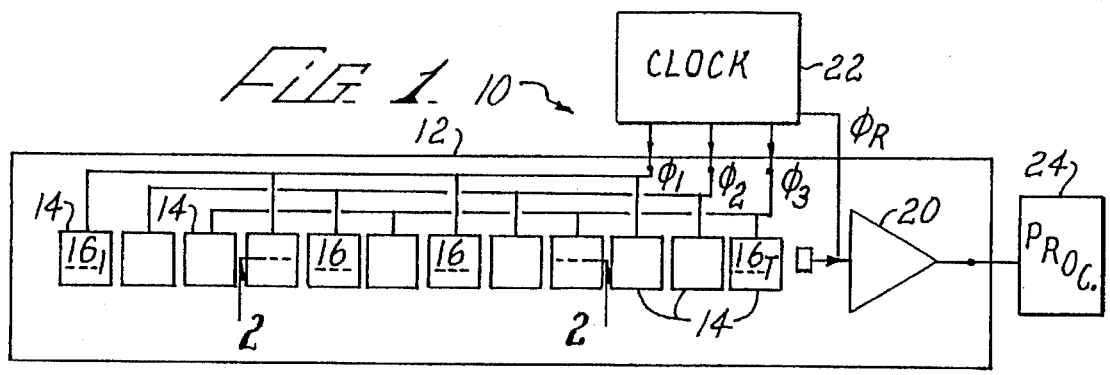
FIG. 1
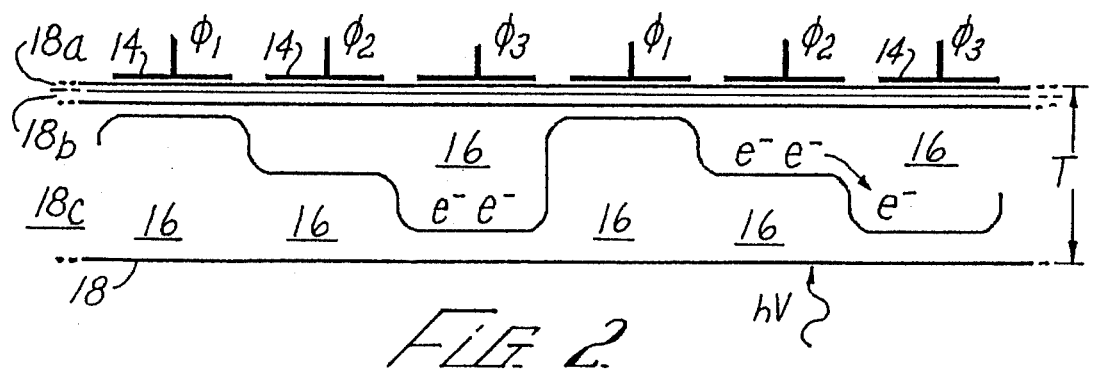
FIG. 2
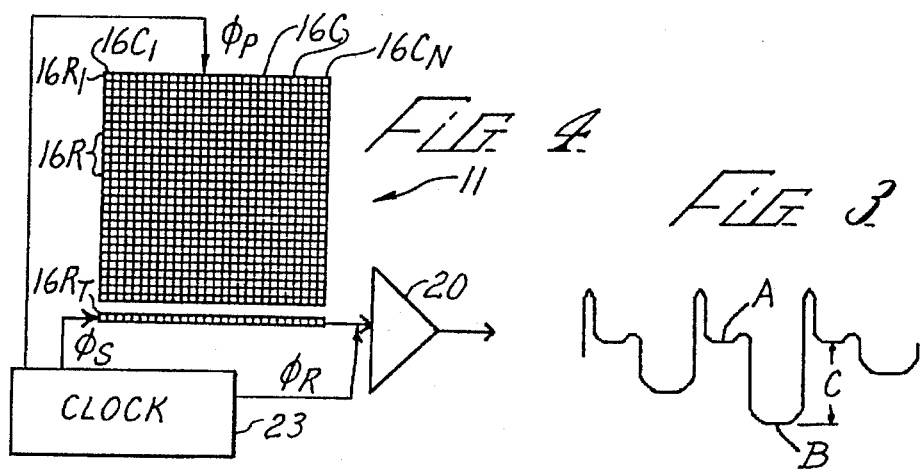
FIG. 4
FIG. 3

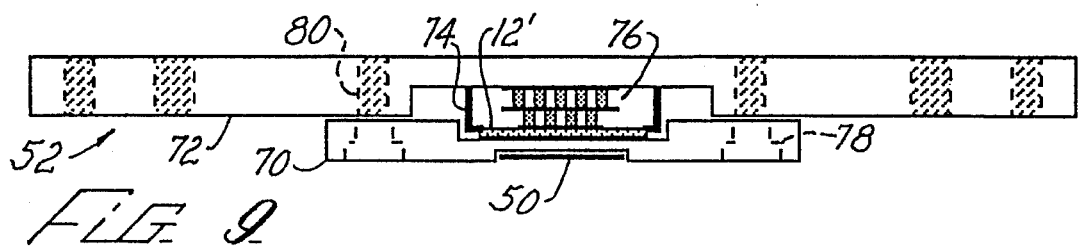
FIG. 9
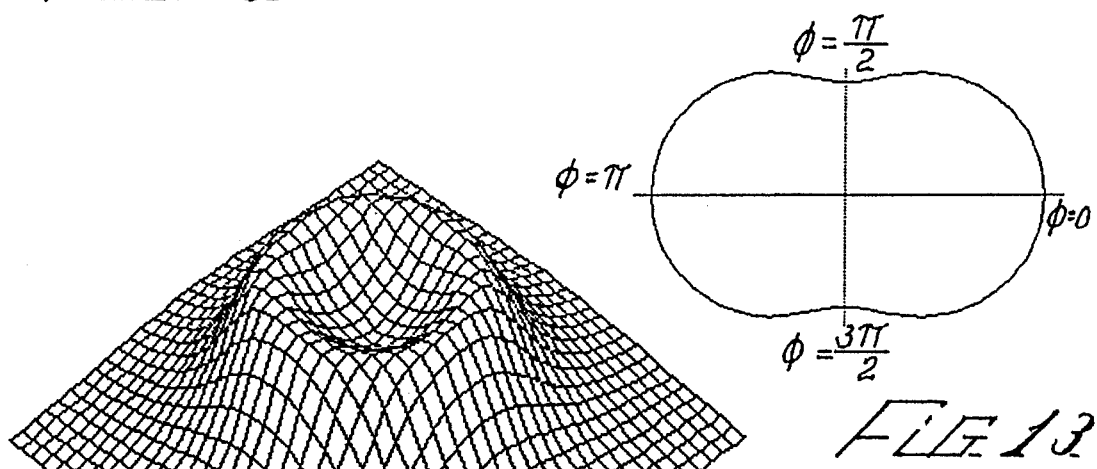
FIG. 10
FIG. 13
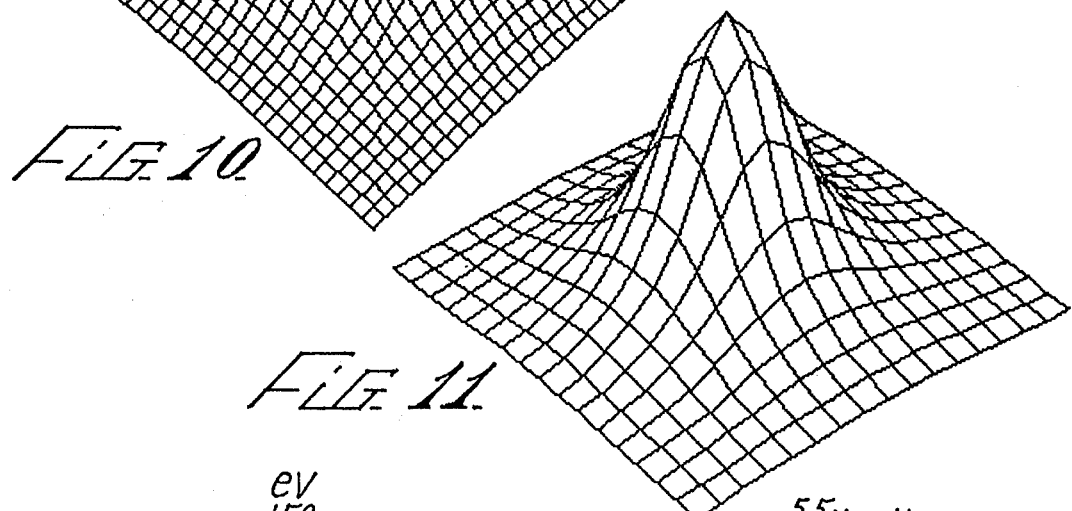
FIG. 11
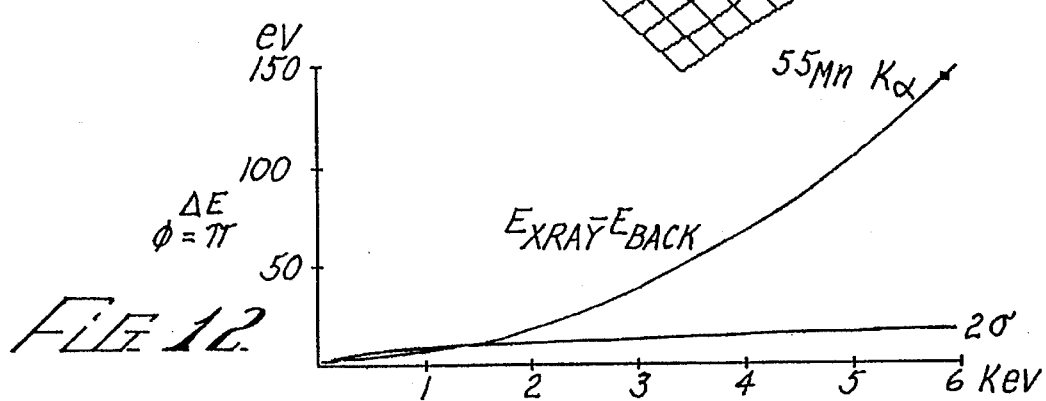
FIG. 12

ENERGY RESOLVING X-RAY DETECTOR

BACKGROUND

The present invention relates to radiation detectors and x-ray energy spectroscopy.

Elemental compositions of many materials are discoverable by the process of x-ray fluorescence, wherein atoms excited by high energy x-ray absorption re-emit the energy as x-rays having lower energy. The energy distribution of the re-emitted x-rays forms an elemental "fingerprint" that is useful for identifying the composition. X-ray spectroscopy is particularly effective fox determining elemental abundances in that the energies of the characteristic x-rays of an element are little changed by the environmental matrix of the element, unlike spectroscopy in the ultraviolet, visible and infra-red spectrums.

The energy of these characteristic x-rays generally increases with increasing atomic number (Z), as does the energy spacing between the characteristic emissions. Higher energy x-rays are generally easier to detect than low energy x-rays in that they are more penetrating and generate a larger signal in an energy sensitive detector. Thus elements of higher Z are easier to isolate and quantify than elements of low Z. For example, silicon (Z=14) is used extensively in a wide variety of applications, including semiconductor fabrication and lubrication. Silicon is also used in thin coatings as a release agent on paper and plastic substrates, giving rise to a need for monitoring the thickness and quality of the coatings. X-ray spectroscopy directed to silicon has had limited success in the prior art because of its low atomic number and because of the likely presence of other common low atomic number elements such as aluminum and calcium that have similar x-ray fingerprints.

The performance of an x-ray spectrometer is most often limited by the performance of the x-ray detector utilized, x-ray detectors of the recent prior art exhibiting tradeoffs between energy resolution, response time, and cooling requirements. Available devices having the highest performance require complex support equipment; thus spectrometers utilizing these devices have large physical size and/or slow response times. High performance spectrometers find application in laboratory analysis of metals, ceramics, pharmaceuticals, and other products wherein sample analysis typically requires extensive preparation and then many minutes to hours of data acquisition. Lower performance devices having less sensitivity and energy resolution find application in industrial process quality control, the industrial units typically operating off-line with sample analysis requiring little preparation and only a few minutes of data acquisition time.

Detectors in common use for x-ray energy spectroscopy include scintillation detectors, gas-proportional detector tubes, lithium-drifted silicon detectors, and large-area PIN photodiodes. Scintillation detectors down-shift the x-ray energy to the optical spectrum, requiring further detection by an optical detector such as a photo-multiplier tube, whereas the remaining detectors provide a direct electrical output. The main operational parameters of these typical detectors are given below in Table 1.

TABLE 1

| Detector Type | scin./PMT | gas | Si—Li | PIN—PD |
|---|---|---|---|---|
| Energy Range (kev) | 5–1000 | 1–100 | .1–100 | 1–100 |
| Resolution @ 6 kev | 1–2 kev | 800 ev | <100 ev | 1 kev |
| Detection Efficiency | 30% | 50% | >90% | >70% |
| Max. Count Rate (kHz) | 1000 | 200 | 1000 | >1000 |
| Cooling Requirements | none | none | $LN_2$ (77 K) | <25 C |

To provide a useful output, the detector must generate a signal that is significantly above thermal noise limits. An energy-sensitive x-ray detector provides a series of pulses that must then be quantified as to the energy of the x-ray each pulse represents. The energy resolution of this process determines the range and resolution of elements that may be effectively identified. The counting statistics of the pulses determine the statistics of the final quantitative measurement.

Conventional detectors are classified as avalanche and non-avalanche. Avalanche detectors feature some form of internal gain (such as the electron cascade in a gas proportional tube or photo-multiplier tube) to raise the signal level above background noise. Since they have no internal gain mechanism, non-avalanche detectors require extensive cooling such as by liquid nitrogen for reducing background noise. Another class of detectors includes charge-coupled array detectors (CCD's), typical examples thereof being commercially used in video cameras. A CCD detector can provide a non-avalanche effective gain equal to the ratio of the equivalent capacitance of the entire imaging area of the device (typically $10^5$ pf) to the capacitance of the output amplifier MOSFET gate (typically 0.25 pf).

Although normally utilized for the detection of infrared or visible light, the CCD has two basic characteristics that are advantageous for the detection of soft x-rays: A large active area (>5 cm² possible); and low inherent noise (less than 10 e– possible). The x-ray sensitivity of the CCD was first exploited extensively by James Janesick and others as a tool to characterize the performance of the CCD because it was observed that a good CCD in the x-ray domain was an excellent CCD in the visible domain. See, for example, Robinson et al., "Performance Tests of Large CCDs," *Charge-Coupled Devices and Solid State Optical Sensors* II (SPIE Vol. 1447, 1991), p. 214. In particular, testing in the x-ray domain led to identification of the important CCD characteristic "charge-transfer-efficiency" (CTE).

Conventional CCD's, as used in video cameras, have a number of drawbacks in x-ray detector applications, such as a parallel set of "shadow" registers that are used in the frame transfer process required for video format signals. These shadow registers are opaqued and not available for x-ray detection, wasting valuable detector area. Video CCD's operate at a high data rate such that low-noise operation is not possible, and thus are not optimized for low noise. Also, any window on the device package absorbs the low-energy x-rays of interest.

CCDs more suitable for x-ray detection are also known, being high-quality, scientific-grade, windowless devices that do not have shadow registers. Since the electrodes used for charge transport across the detector array block photon absorption, scientific-grade CCD's are often operated in a thinned, backside-illuminated mode. For these devices, the bulk silicon from the rear of the CCD chip is removed until the chip is only 10 microns thick. The chip is then mounted upside-down to allow maximum photon transmission and the resulting assembly is cooled to reduce thermal noise contributions.

Although CCDs have been used in x-ray detection, it is believed that all prior art x-ray detection applications of the CCD are for intensity sensing, not energy sensing. Also, it is believed that all prior art applications of the CCD have utilized the device in an imaging mode.

Thus there is a need for an x-ray detector that has high energy resolution for detecting low-Z elements, high detection efficiency for rapid data acquisition, that is statistically accurate, that is inexpensive to provide, and that does not have excessively burdensome cooling requirements. There is a further need for a spectrometer that exhibits these advantages.

SUMMARY

The present invention meets this need by providing an energy-resolving x-ray detector. In one aspect of the invention, the detector includes a charge-coupled integrated circuit radiation detector device having an array of collection regions with an associated transport electrode, the collection regions forming at least one collection shift register, and an output amplifier for sequentially amplifying and signalling the charges received by the collection shift register; and a clock circuit connected to the transport electrodes for sequentially shifting charges between collection regions of the collection shift register and into the output amplifier during continuous exposure of the array to incoming radiation, each of the charges received by the output amplifier being sequentially accumulated in each of the collection regions of the collection shift register in response to the radiation.

The detector device can include a parallel plurality of the collection shift registers, each collection shift register forming a column of the array, corresponding collection regions of the collection shift registers forming rows of the array. The detector device can further include a row shift register connected between the collection shift registers and the output amplifier, the row shift register having cell regions and associated transport electrodes, the transport electrodes of the row shift register being connected to the clock circuit, the clock circuit being operative for periodically shifting the charges from each of the collection shift registers into a corresponding element of the row shift register, and for sequentially shifting the charges from the row shift register to the output amplifier. Preferably the clock circuit has a three-phase row output for driving the transport electrodes of the row shift register, and a three-phase column output for driving the transport electrodes of the collection shift registers.

Preferably the output amplifier has a reset connection to the clock circuit for momentarily resetting the input to the output amplifier at a predetermined level prior to receipt of each of the charges into the output amplifier. The detector can further include a correlated double sampling signal chain responsive to the output amplifier and the clock circuit for generating an analog sample signal for each charge received into the output amplifier, the analog sample signal being proportional to the energy of the incoming radiation having reached successive collection regions of the collection shift register during accumulation of the received charge.

The present invention also provides a spectrometer having the detector in combination with a source of x-ray radiation for producing x-ray fluorescence of a sample, the detector being responsive to the fluorescence of the sample. The source of x-ray radiation can be a radioactive material. The radioactive material forms a ring-shaped member surrounding a radiation path between the sample and the detector array. The array of collection regions can be planar, the ring-shaped member being supported parallel to the array, being axially spaced from the array not more than approximately 25% of a path length between the sample and the array for enhancing a field of view from the array to the sample. The radioactive material can include iron-55. The source of x-ray radiation can be an x-ray tube.

Preferably the spectrometer further includes a histogram generator for recording a relative frequency of events within predetermined energy ranges in response to the output amplifier of the detector device. The spectrometer can include an event filter connected between the output amplifier and the histogram generator, the event filter including a threshold detector for identifying as events received charges having at least a predetermined magnitude; an event correlator for determining the occurrence of correlated events in adjacent collection regions of the detector device; and an integrator for combining as a single event the magnitudes of the correlated events. The event filter can further include an event discriminator for rejection of ambiguously correlated events.

The adjacent collection regions can be within a moving rectangular discrimination window array, a base element of the window array corresponding to a collection region of the detector device from which an event is detected. The window array can be a 3 by 3 array, a center element of the array being the base element.

The present invention can further provide a coating thickness gauge having the spectrometer in combination with an analysis processor, the analysis processor receiving intensity ratios within predetermined energy bands from the spectrometer, the processor subtracting a base calibration value from the intensity of an energy band associated with a material being measured for producing a corrected abundance, the processor applying a net multiplier to the corrected abundance for generating a net coating thickness.

In another aspect of the invention, a method for detecting energy levels of x-ray radiation includes the steps of:

(a) providing an array of radiation collection regions and associated transport electrodes in a charge-coupled integrated circuit;

(b) continuously exposing the array to x-ray radiation;

(c) biasing the electrodes for the collection of electron charges in the collection regions in response to the x-ray radiation;

(d) coupling an output amplifier to the array; and (e) clocking the transport electrodes for sequentially shifting the collecting charges to an input of the output amplifier, the output amplifier signalling the energy levels of the x-ray radiation.

DRAWINGS

These and other features, aspects, and advantages of the present invention will become better understood with reference to the following description, appended claims, and accompanying drawings, where:

FIG. 1 is a plan pictorial block diagram of an energy resolving x-ray detector according to the present invention;

FIG. 2 is a sectional elevational view of a portion of the detector of FIG. 1 on line 2—2 therein;

FIG. 3 is an output waveform of the detector of FIGS. 1;

FIG. 4 is a plan pictorial block diagram showing a preferred alternative configuration of the detector of FIG. 1;

FIG. 9 is a sectional elevational view showing a preferred thermal-electrically cooled configuration of the sensor of FIG. 7;

FIG. 10 is a plot of sample irradiance produced by the sensor of FIG. 7;

FIG. 11 is a plot of detector signal distribution for the sensor of FIG. 7;

FIG. 12 is a plot of Compton energy shift for the sensor of FIG. 7;

FIG. 13 is a plot of scattering differential cross-section for the sensor of FIG. 7;

DESCRIPTION

Figure 5:
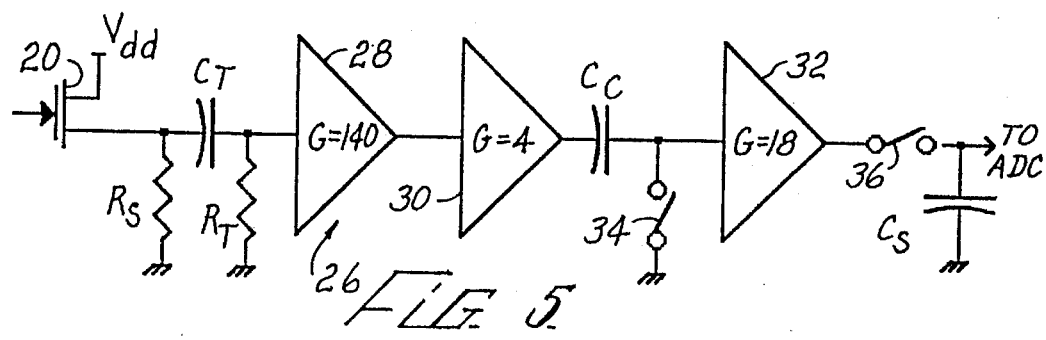
FIG. 5 is a simplified schematic diagram of an analog signal chain.

The present invention is directed to an energy resolving x-ray detector that is particularly effective in discriminating low level soft x-rays such as those produced by fluorescence of elements having relative low atomic number (Z) in the range of 9–23. The invention is also directed to methods and apparatus utilizing the detector. With reference to FIGS. 1–3 of the drawings, a detector unit 10 includes a semiconductor integrated circuit 12 having a plurality of transfer electrodes 14 for forming an array of potential wells 16 in a substrate 18 of the circuit 12. As shown in FIG. 2, the substrate 18 includes $SiO_2$ in a very thin first layer 18a facing the electrodes 14, N—Si in a second layer 18b, and P—Si in a third layer 18c, the substrate 18 having a total thickness T under the electrodes 14. As indicated in FIGS. 1 and 2, the electrodes 14 have a three-phase configuration. In 3-phase devices the electrodes overlap and block incoming radiation, necessitating thinning of the device for permitting entry of the radiation from the back side. Accordingly, the thickness T made very small, being preferably from approximately 10 μm and approximately 20 μm for permitting soft x-ray penetration into the potential wells 16 from opposite the electrodes 14. Soft x-rays entering collection regions that are formed by the potential wells 16 produce multiple electron-hole pairs, the pairs being separated by the presence of an electric field using appropriate biasing of the electrodes 14 by methods known to those skilled in the art of CCD detectors. In silicon, one electron-hole pair is generally produced for every 3.66 ev of x-ray energy. Electron charges are thus trapped in the potential wells 16, the wells 16 holding respective "pixels" (picture elements) of the detector unit 10.

CCD detection efficiency for soft x-rays is primarily a factor of the depth of the depletion region and the thickness of absorbing layers above the depletion region. The thicker the depletion region, the higher the probability for absorption. Absorption above the depletion layer represents a loss mechanism. X-rays absorbed below the depletion region generate electron-hole pairs that generally recombine instead of becoming trapped in a potential well. Typical detection efficiencies for CCD detectors in the soft x-ray region are on the order of 50%.

The integrated circuit 12 also includes an output amplifier 20 for sequentially receiving the pixels as charge signals from a terminal one of the potential wells, designated $16_T$ as described herein. According to the present invention, the electrodes 14 are connected to a multi-phase transfer clock 22 for sequentially shifting the electron charges between the potential wells 16 and into the output amplifier 20, the wells 16 functioning as a collection shift register wherein the electron charges separated from electron-hole pairs in each potential well 16 are accumulated in each clocking interval together with the charge, if any, having been transferred from the adjacent upstream well 16. Thus the electron charges of each pixel are accumulated and transferred in bucket-brigade fashion from a first potential well $16_1$ to the terminal well $16_T$ and thence to the output amplifier 20 during continuous exposure of the array to incoming radiation. Accordingly, the detector unit 10 of the present invention provides for accumulation of charges in a single pixel over the full area of the potential wells 16, for enhanced signal to noise ratio. The detector unit 10 as described above is thus characterized as operating in "time-delay-and-integrate" mode and is believed to provide significantly enhanced energy discrimination of soft x-ray signals. In addition to providing multi-phase clocking signals, designated $\phi_1$, $\phi_2$, and $\phi_3$, the transfer clock 22 preferably issues a reset clock signal $\phi_R$ periodically to the input of the output amplifier 20 for resetting the input of the output amplifier 20 to a known voltage prior to a pixel being shifted to the output amplifier 20. Although a three phase clocking scheme is shown in this exemplary configuration, any clocking scheme which ensures a controllable flow of charge to the output amplifier 20 is applicable. The reset clock signal $\phi_R$ produces a measurable base level output of the amplifier 20, as indicated at A in FIG. 3. When the charge contents of the pixel are shifted into the output amplifier 20, there is a corresponding signal voltage level output as indicated at B in FIG. 3. The difference between the base level A and the signal level B, designated energy signal C, is detected by correlated double sampling by a signal processor 24 as described below and is directly proportional to the accumulated charge in each successive pixel. The other features in the output waveform are due to capacitative feedthrough of the various clocking signals and are ignored in processing the signal.

With further reference to FIG. 4, an alternative and preferred configuration of the detector unit, designated 10', has the potential wells 16 in a two-dimensional pixel array of rows 16R and columns 16C in a counterpart of the integrated circuit, designated 12' wherein the electron charges are sequentially shifted in parallel from a first row $16R_1$ to a terminal row $16R_T$ of the array and serially from the terminal row $16R_T$ into the output amplifier 20. The columns 16C also range from a first column $16C_1$, to a last column $16C_N$, the last column $16C_N$ corresponding to the potential wells $16_1$ to $16_T$ of FIGS. 1 and 2. The detector unit 10' includes a counterpart of the multi-phase transfer clock, designated 22', having two sets of outputs, designated $\phi_P$ and $\phi_S$, for appropriately biasing the potential wells 16 and transporting the accumulated electron charges to the output amplifier 20. More particularly, the clock outputs $\phi_P$ effect shifting of the charges sequentially from the first row $16R_1$ to the terminal row $16R_T$, and the clock outputs $\phi_S$ effect shifting of the charges in the terminal row $16R_T$ sequentially from the first column $16C_1$ to the last column $16C_N$ in each clock interval of the clock outputs $\phi_P$. The detector unit 10' of the present invention thus provides for accumulation of charges in a single pixel over a relatively large area of the circuit 12' corresponding to one of the columns 16C, each pixel integrating received electron charges over a respective full column 16C of the integrated circuit 12'.

The transfer clock 22' also provides a counterpart of the reset clock signal $\phi_R$ for resetting the input of the output amplifier 20 to a known measurable voltage prior to a pixel being shifted to the output amplifier 20 as described above. Thus the output waveform of the amplifier 20 is characterized as described above in connection with FIG. 3, the detector unit 10' also preferably including a counterpart of the signal processor 24.

With a large sensitive surface, shallow depletion region, and low noise level, the CCD integrated circuit 12' of the present invention is an excellent detector for soft x-rays. Many of the benefits of using a CCD as the integrated circuit 12 or 12' for detecting soft x-rays result from the very small input capacitance of the output amplifier 20, allowing in low noise charge detection. This is in contrast to the avalanche gain mechanisms used by conventional radiation detectors for driving the larger input capacitances that are associated with external amplifiers.

The fraction of charge that is actually transferred between two potential wells 16 during a shift is called the charge transfer efficiency (CTE). Typical CTEs for CCDs are greater than 99.995%. Non-unity CTEs result in charge trailing and a subsequent loss of energy resolution. For example, a CTE of 0.99995 will result in a 5% signal charge loss in 1024 shifts. Thus CTE limits energy resolution and the maximum size of a CCD array that can be used. In practice, CTE is very dependent upon the surface quality of the CCD and is critically related to the levels of the clocking voltages used for transporting charge across the integrated circuit 12 or 12'. There is also an ageing effect wherein high-energy radiation creates surface defects that alter the optimal clocking voltages and generally decreases the CTE. This ageing loss can be quantified by observing the charge trails of an x-ray event, and a high CTE can be restored by recalibrating the CCD clock voltage levels.

Noise associated with the detection process itself decreases the x-ray energy resolution achievable by the detector unit 10. CCD noise components include shot noise, dark current noise, reset uncertainty, and on-chip amplifier noise. Additionally, external amplifier noise and A/D sampling noise must be considered in a complete noise analysis of the resolution of the detector unit 10.

Shot noise is the quantum-mechanical fluctuation in electron-hole pair generation and generally follows the square-root of the number of electron-hole pairs generated. However, as the generation of electron-hole pairs by absorption of a single x-ray event is correlated, this noise is reduced due to conversion-of-energy considerations by a coefficient known emperically as the Fano factor F, whereby $N_{shot}= F \cdot (N_{pair})^{1/2}$. For a silicon detector the Fano factor is typically 0.1.

Dark current results from the thermal generation of electron-hole pairs and is primarily a function of device construction and temperature. As the average dark current is constant over time, it can be removed by simple subtraction, leaving only the shot noise contribution of the dark current uncorrected. Dark current is reduced by cooling the CCD and is roughly halved for every 7° K. decrease in device temperature.

Reset uncertainty results from thermally induced variations in the precharging of the input capacitance of the output amplifier 20 during activation of the reset clock signal $\phi_R$. This is eliminated by externally sampling the base level A after every pixel as described below, leaving only the sampling noise of this measurement uncorrected.

On-chip amplifier noise is thermally induced transistor noise in the output amplifier 20. It is dependent upon both temperature and the physical transistor characteristics. This noise is minimized by cooling as described below.

With further reference to FIG. 5, the output amplifier 20 preferably feeds an analog signal chain 26 of the signal processor 24 for effecting the correlated double sampling as described herein. Optimal energy resolution using a CCD for soft x-ray detection depends upon minimizing noise sources as discussed above. A well manufactured CCD, cooled to −90° C. and with the clock voltages and timing optimally adjusted, has a theoretical noise floor of only one or two electrons. It is desired to preserve this performance by appropriate design and timing of the analog signal chain 26, shown in simplified form in FIG. 5.

The analog signal chain 26 includes a resistor $R_S$ that functions as a transistor load resistor for the output amplifier 20 of the integrated circuit 12 or 12'. The CCD output is A.C. coupled through a high-pass filter combination $C_T$ and $R_T$ into a low noise preamplifier, designated 28 in FIG. 5, a dominant time constant $t_d$ of the analog signal chain 26 being the numerical product $R_T C_T$. The amplified signal from the preamplifier 28 is buffered by a clamp driver 30 that feeds a clamp amplifier 32 through a clamp capacitor $C_C$, the input of the clamp amplifier 32 being selectively grounded by a clamp switch 34. In successive pixel sampling cycles the clamp capacitor $C_C$ is first charged to an upstream offset voltage corresponding to the base level A of FIG. 3, the clamp switch 34 being momentarily closed while the reset clock signal $\phi_R$ is active for eliminating the reset uncertainty from the pre-charging of the [CCD reset] capacitor $C_C$. This uncertainty, being typically on the order of several hundred electrons, is thus avoided by the double correlated sampling described herein. The clamp switch 34 is then opened prior to termination of the reset clock signal $\phi_R$, the clamp amplifier next being driven by an amplified counterpart of the energy signal C for charging a sample capacitor $C_S$ through a sample switch 36. The sample switch 36 is preferably closed only while the signal voltage level B is present at the output amplifier 20 for charging the sample capacitor $C_S$ with an amplified counterpart of the charge of the pixel. The resulting voltage on the sample capacitor $C_S$ is typically for further processing such as described below.

Between the sample periods A and B, an additional uncertainty is introduced by the "off" state resistance of the CCD on-chip reset capacitor charging MOSFET, $R_{off}$. The resulting signal uncertainty may be described as $$N_{sig}=N_{pc}[2(1-e^{-\Delta t/R_{off}C_{pc}})]$$

where $N_{sig}$=number of noise electrons;

$N_{pc}$=reset uncertainty;

$\Delta t$=the time interval between samples;

$R_{off}$=the reset MOSFET "off" state resistance; and $C_{pc}$=on-chip reset capacitance.

The contribution of $R_{off}$ noise to the correlated double sampling noise is seen to be minimized by minimizing the time between samples A and B. However, this implies a larger signal bandwidth and hence a larger white noise contribution growing as $1/f^2$. The white noise is thus minimized by increasing the dominant time constant, $t_d$ (signal bandwidth=$1/t_d$). The signal/noise ratio is then described by $$s/n = \sqrt{t_d}\ (1-e^{\Delta t/t_d})$$

The optimum signal/noise occurs when the derivative of the above relation with respect to $t_d$ is zero. This is when $\Delta t/t_d=1.255$. With an optimized signal chain a noise floor of less than ten electrons is achievable. In practice the pixel rate is preferably first set to the slowest rate that still substantially minimizes the number of multiple-pixel events. Then the corresponding maximum sample interval $\Delta t$ is used to set the high-pass filter combination $R_T$ and $C_T$ of FIG. 5 such that $R_T C_T \approx \Delta T/1.255$.

Another "noise" source is distribution of the charge generated by a single x-ray absorption event to more than one pixel, such as when an x-ray photon is absorbed near a boundary between potential wells 16, resulting in the splitting of the accumulated charge. This effect is reduced according to the present invention by combining the contents of neighboring pixels when accumulating an energy histogram as further described below. However, the correction is limited both by CTE charge trailing effects and by count rate limitations.

Figure 6:
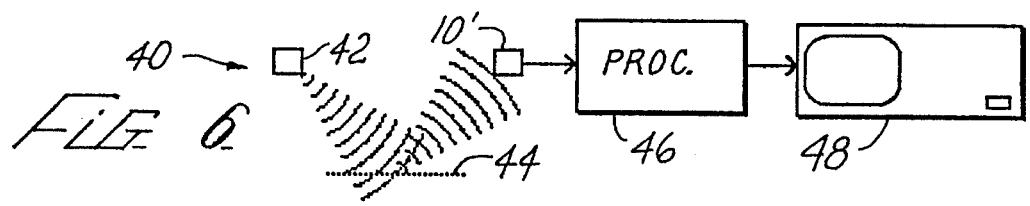
FIG. 6 is a pictorial block diagram of an x-ray spectrometer incorporating the detector of FIG. 1.

With further reference to FIG. 6, a spectrometer 40 according to the present invention includes an x-ray source 42 (which can be a conventional x-ray tube) for fluorescing a sample 44, the detector unit 10 or 10' being positioned for receiving fluorescence x-rays from the sample 44 in response to primary x-rays from the source 42. As shown in FIG. 6, the spectrometer 40 includes a processor 46 and a display 48 for displaying the analysis of an energy histogram of the detected fluorescence.

With further reference to FIGS. 7–12, a preferred implementation of the spectrometer 40 has a radioactive counterpart of the x-ray source, designated x-ray source 50, combined with a counterpart of the detector unit 10' in a sensor unit 52. For high sensitivity the source 50, the CCD detector integrated circuit 12' of the detector unit 10', and the sample 44 are preferably tightly coupled. Accordingly, the x-ray source 50, configured as an annulus, is supported concentrically a short distance below the array of potential wells 16 of the integrated circuit 12'. In an exemplary configuration of the sensor unit 52, the x-ray source 50 is formed as a coating of $^{55}$Fe material 54 on a ring-shaped source substrate 56, a suitable material for the substrate 56 being copper. The x-ray source 50 has an outside diameter $S_{OD}$ and a clear aperture 58 of inside diameter $S_{ID}$. The source 50 and the integrated circuit 12' are located behind an optically opaque, x-ray transmitting window 60 (such as beryllium foil) in an evacuated chamber 62.

Figure 7:
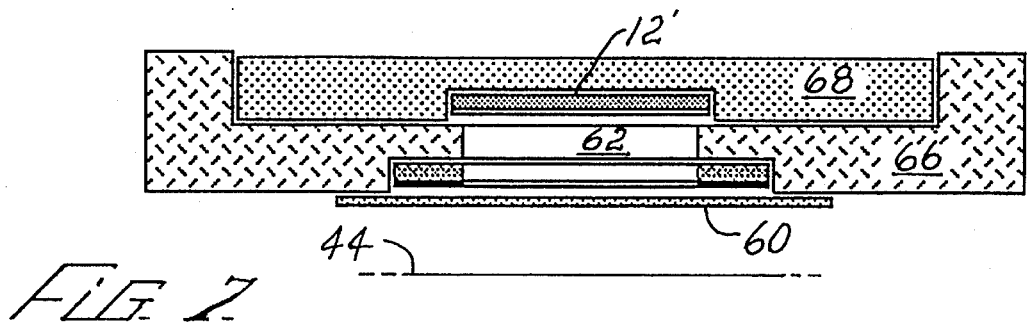
FIG. 7 is a sectional elevational view of a preferred x-ray sensor incorporating the detector of FIG. 1.
Figure 8:
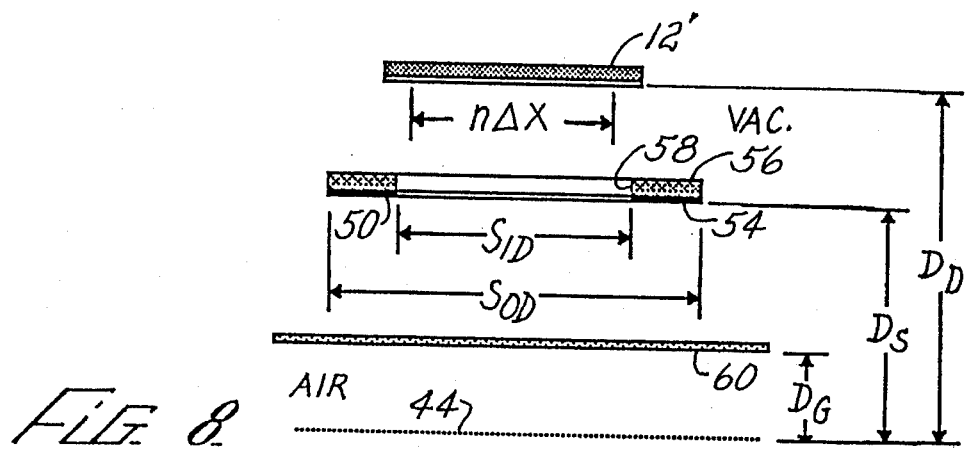
FIG. 8 is a simplified sectional elevational view of the sensor of FIG. 7, with dimensions.

In one configuration of the sensor unit 52, the CCD integrated circuit 12' and the x-ray source 50 are mounted within a machinable ceramic holder 64. As shown in FIG. 7, the integrated circuit 12' is clamped between a horizontally disposed plate member 66 and a retainer 68 of the holder 64, the geometry of the sensor 52 being arranged for minimizing both a source to sample distance $D_s$ and a sample to detector distance $D_D$ as indicated in FIG. 8 for achieving a high coupling efficiency with the sample 44 between the x-ray source 50 and the CCD integrated circuit 12'. The window 60 is sealingly affixed to the underside of the plate member 66 at an air gap spacing $D_G$ from the sample 44. Suitable materials for the plate member 66 and the retainer 68 are mica/glass and alumina, respectively.

As shown in FIG. 9, a preferred configuration of the sensor unit 52 has thermoelectric cooling applied to the CCD integrated circuit 12' the sensor unit 52 having a counterpart of the plate member 66 configured as a cold plate 70 that is insulatingly spaced from a hot plate 72. The integrated circuit 12' is clampingly retained on the cold plate 70 by an insulating spacer 74 that extends along an outer margin of the integrated circuit 12', the spacer 74 being clamped by the hot plate 72. An array of thermoelectric coolers 76 also extends between the integrated circuit 12' and the hot plate 72 for transferring heat from the integrated circuit 12' to the hot plate 72, whereby the integrated circuit 12' is cooled to approximately −50° C. for reducing the dark current and the on-chip amplifier noise of the integrated circuit 12'. The hot side of the thermoelectric coolers 76 contacts the hot plate 76 for conducting dissipated heat to a liquid to air heat exchanger (not shown). A suitable material for the hot plate 76 is copper for efficient heat transfer. The cold side of the thermoelectric coolers directly contacts a package outline of the CCD integrated circuit 12'. The cold plate 70 is connected to the hot plate 72 by a plurality of insulating fasteners 80, the fasteners 80 applying clamping force to the spacer 74 through the integrated circuit 12' and maintaining the coolers 76 in good thermally conductive contact with the integrated circuit 12' and the hot plate 72. The x-ray source 50 is also mounted to the cold plate 70 as shown in FIG. 9. Other details of the sensor unit 52, including the window 60 and the evacuated chamber 62, not shown in FIG. 9, are as described above in connection with FIGS. 7 and 8.

It is desired to provide a high and relatively uniform concentration of x-ray radiation onto the sample 44, together with efficient transmission of resulting fluorescence radiation back to the CCD integrated circuit 12'. Sample irradiance is conveniently represented in cylindrical coordinates ($\rho$, $\zeta$, $\phi$) due to polar symmetry of the exemplary x-ray source 50 described above. With the x-ray source 50 centered at ($\zeta=0$, $\rho=D_S$) and assuming no absorption in the path, the sample irradiance $\Gamma$ in the $\rho=0$ plane can be described by $$\Gamma = \beta \iint \frac{dA}{A_E}$$

where $\beta$=the source activity per unit area;

$dA$=the area element of the annular ring ($\rho d\phi d\rho$); and $A_E$=the area of the incident wavefront at the sample point.

Assuming a spherical emitted wavefront and describing $\Gamma$ in Cartesian coordinates gives $$\Gamma(x,y) = \frac{\beta}{4\pi} \int_{S_{ID}}^{S_{OD}} \int_{-\pi}^{\pi} \frac{\rho}{D^2{}_S + (x-\rho\cos\phi)^2 + (y-\rho\sin\phi)^2}\, d\phi d\rho$$

where (x,y)=the sample point of interest;
$D_S$=separation between the source and the sample;
$S_{ID}$=inner diameter of the source annulus;
$S_{OD}$=outer diameter of the source annulus,
Which then simplifies to $$\Gamma(x,y) = \frac{\beta}{4\pi} \int_{S_{ID}}^{S_{OD}} \int_{-\pi}^{\pi} \frac{\rho}{R^2 + \rho^2 - 2\rho(x\cos\phi + y\sin\phi)} \, d\phi d\rho$$

where $R^2 = D_S^2 + x^2 + y^2$. A plot of this simplified irradiance function is shown in FIG. 10.

This last equation neglects the absorption in transmission through the x-ray transmitting window 60 and air between the window and the sample. Each absorption may be described by $$I_t = I_0 e^{-k_\mu d}$$

where
$I_t$=transmitted amplitude;
$I_0$=incident amplitude;
$k_\mu$=linear absorption coefficient; and
d=path length in material.

Noting that the path length for the absorption term depends upon the vertical angle $\phi$ between the source point and the sample point, an exponential attenuation coefficient may be added to the simplified irradiance function, yielding $$\Gamma(x,y) = \frac{\beta}{4\pi} \int_{S_{ID}}^{S_{OD}} \int_{-\pi}^{\pi} \frac{\rho}{L^2 e^{k_\Sigma L}} \, d\phi d\rho$$

with $L^2 = R^2 + \rho^2 - 2\rho(x\cos\phi + y\sin\phi)$ and $k_\Sigma$ the total material absorption coefficient given by $$k_\Sigma = \sum_{n=1}^{N} \frac{k_n}{d_n}$$

where $k_n$ is the absorption coefficient for the nth material of thickness $d_n$.

The signal at the CCD integrated circuit 12' of the detector unit 10' may be described in a fashion similar to the sample irradiance by a signal distribution function $$S = Y_{ccd} \int_{y_i}^{y_f} \int_{x_i}^{x_f} \left[ \frac{Y_e e^{-\mu_e}}{4\pi} \iint \frac{\Gamma}{L^2 e^{k_\Sigma L}} dA \right] dxdy$$

where
S=the signal detected by the CCD;
$Y_{ccd}$=the quantum efficiency of detection by the CCD;
$\mu_e$=absorption coefficient for the element of interest;
$Y_e$=the quantum efficiency of fluorescence for the element;
$k_\Sigma$=the total linear absorption coefficient, above;
L=distance from sample point to detector point; and
$\Gamma$=sample irradiance.

An example of the resulting signal distribution at the CCD detector is plotted in FIG. 11.

In the configuration of FIGS. 7 and 8, it is desired to keep the difference between $D_S$ and $D_D$ small, providing a large field-of-view for the detector unit 10' through the annular x-ray source 50, for enhancing the detected signal. An optimum $D_S$ is found by maximizing the integrated sample intensity within this field-of-view. Accordingly, a preferred exemplary configuration of the sensor unit 52 has the following dimensions:

$n\Delta X$=13.8 mm
$S_{ID}$=13.8 mm
$S_{OD}$=19.8 mm
$D_D$=4 mm
$D_S$=2 mm
$D_G$=1 mm In detecting the fluorescence signal, x-ray photons are converted to electrons in the CCD by electron-hole pair production according to $$N_e = \frac{E_{xray}}{E_{pair}}$$

X-ray energies for the predominant lines of some common light elements are listed in Table 2 below. Also shown is the number of electrons generated in silicon, where $E_{pair}$=3.66 ev.

TABLE 2

| Element  |    | Kev  | Å   | $N_e$ (Si) |
|----------|----|------|-----|------------|
| Aluminum | Al | 1.49 | 8.3 | 407        |
| Silicon  | Si | 1.74 | 7.1 | 475        |
| Sulphur  | S  | 2.31 | 5.4 | 631        |
| Argon    | Ar | 2.95 | 4.2 | 806        |
| Calcium  | Ca | 3.69 | 3.4 | 1008       |
| Titanium | Ti | 4.51 | 2.7 | 1232       |

Collected charge is converted to a voltage at the output amplifier of the CCD detector serial output register according to $$V = \frac{qN_e}{C}$$

where
V=amplifier gate voltage;
q=charge on an electron, $1.6 \times 10^{19}$ coulomb;
$N_e$=number of electrons; and
C=gate capacitance at output amplifier.

For a typical CCD capacitance of 0.33 pf this yields a sensitivity of 0.47 µV/e⁻, or 230 µV for a silicon x-ray.

A detected abundance of particular elements on the sample 44 using the spectrometer 40 is related to particular fluorescence coefficients of elements. Of particular interest are silicone polymers.

The quantum efficiency of fluorescence $\gamma_e$ for the silicon 1.7 Kev line is approximately 5%. An approximate value for the absorption coefficient $\mu_e$ is arrived at by considering the following generic dimethylsiloxane polymer unit:

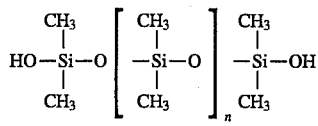

Given a linear absorption coefficient for pure silicon $\mu_{Si}$, the absorption coefficient $\mu_{sx}$ of the above signal distribution function (see FIG. 11) for silicone can be approximated $$\mu_{sx} = \mu_{Si} T \frac{D_{sx} M_{Si}}{D_{Si} M_{sx}}$$

where
$T_{sx}$=the sample thickness;
$D_{sx}$=density of silicone sub-unit ($\approx 0.92$ g/cm$^3$);
M=molecular weight of silicone sub-unit (74.1 g/mole);
$D_{Si}$=density of silicon (2.33 g/cm3); and
$M_{Si}$=molecular weight of silicon (28.1 g/mole).

Silicone coatings are commonly specified in terms of mass per unit instead of thickness, the absorption coefficient being correspondingly expressed as $$\mu_{sx} = \frac{M_{Si} W}{S_{Si} M_{sx}} \mu_{Si}$$

where W is the silicone coat weight. This coefficient is suitable for use in the signal distribution function to relate coating weight to the detected signal.

When measuring the sample 44 at a location thereon being guided by a roll additional or background contributions to the signal at the detector unit 10' are produced by fluorescence of the roll and by Compton scattering. A steel roll is preferable (to aluminum, for instance), as the $^{55}$Mn x-ray is not able to fluoresce iron atoms. However, alloying elements such as vanadium and manganese in the steel are potential signal contributors.

Due to the high energy resolution of the CCD detector array (narrow x-ray linewidths), the problems associated with interference from other low-Z elements present in the base are minimized. The primary background problem anticipated is silicon present in the form of clays (aluminum-silicates). This contribution to the detected silicon abundance is believed to be partially compensatable by tracking the aluminum abundance and subtracting a proportional fraction of the silicon abundance.

Compton scattering from electrons in the sample results in a portion of the source signal being reflected back to the sensor. By momentum conservation the reflected x-rays are energy shifted as a function of the reflected angle according to $$E_{back} = \frac{E_{xray}}{1 + \alpha(1 - \cos\phi)}$$

where
$E_{back}$=backscattered x-ray energy;
$D_{xray}$=initial x-ray energy;
$\phi$=reflected angle; and
$\alpha = E_{xray}/E_{rest}$, $E_{rest}$ being 0.511 Mev, the rest mass of an electron.

For low-energy x-rays, the energy shift is small, as shown in FIG. 12 in terms of the difference $E_{xray} - E_{back}$ for $\phi = \pi$, along with the theoretical $2\sigma$ lower linewidth limit for $E_{xray}$ assuming a Fano factor of 0.1. Although the energy shift is greater than the linewidth for x-rays above 1.5 Kev, the absolute value of the shift is still small. The $\phi=\pi$ shift for the $^{55}$Mn K$_\alpha$ line is only 150 ev, allowing the backscatter peak to be resolved from even the chromium K$_\alpha$ line at 5.4 Kev.

The scattering cross section $\sigma_c$ for Compton radiation is described as follows by the Klein-Nishina equation ((See O. Klein and Y. Nishina, Z Physik 52 (1929) 853):

$$d\sigma = \frac{Zr_o^2}{2} \chi^2 \left( \chi + \frac{1}{\chi} - \sin^2\phi \right) d\Omega$$

where
$d\sigma$=the differential cross-section for the solid angle $d\Omega$;
Z=the atomic number of the scattering atom;
$r_o$=the classical electron radius, $2.82 \times 10^{-13}$ cm; and
$\chi = E_{back}/E_{xray}$.

For low energy x-rays $\alpha \approx 0$, giving $\chi \approx 1$ and yielding $$d\sigma = \frac{Zr_o^2}{2} (1 + \cos^2\phi) d\Omega$$

The approximate scattering function is symmetric as shown in FIG. 12.

It is useful to compare the signal strength due to Compton scattering with the signal strength due to photoelectric absorption and fluorescent emission. If the Compton signal is too high, it will overload the CCD detector with unresolvable x-ray events, distorting the corresponding energy histogram. Thorough analysis of the Compton signal strength following methods described above is complex; however, the analysis is facilitated by splitting the linear absorption coefficient into two parts $$k_\mu = k_\tau + k_\sigma$$

where
$k_\mu$=total absorption coefficient;
$k_\tau$=photoelectric absorption coefficient; and
$k_\sigma$=Compton scattering "absorption" coefficient.

The coefficient $k_\sigma$ is considered an absorption coefficient in the sense that it represents an intensity loss to the transmitted beam. Thus $$k_\sigma = \frac{N Z D_z r_o^2}{2 M_z} \int_?^? (1 + \cos^2\phi) d\Omega$$

where N=Avogadro's constant;
$D_z$=density of element of atomic number Z; and
$M_z$=molecular weight of element of atomic number, yielding $$k_\sigma = \frac{3\pi N Z D_z r_o^2}{4 M_z}$$

For a reading off of a steel roller, $k_\sigma$ is evaluated using Z=26 for iron, with $D_z$=7.57 g/cm$^3$, $M_z$=55.8 g/mole, yielding $k_\sigma$=0.4/cm. For iron and 5.9 Kev x-rays, $K_\mu$=720/cm. Thus $k_\sigma$ accounts for only 0.06% of the signal loss.

Neglecting the difference in the absorption coefficient for the scattered x-rays, an upper bound to the detectable Compton signal from a homogenous background material can be set by $$I_S = \frac{k_\sigma I_0 \Omega^2}{4 k_\mu \pi^2} \int_0^L e^{-2k_\mu l} dl$$

where
$I_0$=the incident intensity;
$I_S$=the Compton scattered intensity;
$\Omega$=the field-of-view of the detector; and
L=the thickness of the background material.

Integrating and letting the material thickness L→∞ yields $$I_S = \frac{k\sigma I_0 \Omega^2}{8k_\mu^2 \pi^2}$$

as an upper limit for the Compton backscatter signal for low energy x-rays. Continuing the steel roller analysis, and conservatively assuming a source radioactivity of 50 mCi (1.85 GBq) and a detector field of view of 90° would result in a backscatter signal of only 45 counts/sec.

In addition to silicon, the sensor unit 52 is sensitive to the base additives in the form of other low-Z elements possibly present in the sample 44. A table of elements, their primary fluorescence line, effective fluorescent cross-section per atom at 5.9 Kev, and typical CCD output signal sizes are given in Table 3 below.

TABLE 3

Low-Z Elements

| Z | Element | | Kev | Å | σ (barns) | μv |
|---|---------|-----|------|------|-------|-----|
| 11 | Sodium | Na | 1.04 | 11.9 | 0.005 | 133 |
| 12 | Magnesium | Mg | 1.25 | 9.9 | 0.010 | 160 |
| 13 | Aluminum | Al | 1.49 | 8.3 | 0.018 | 191 |
| 14 | Silicon | Si | 1.74 | 7.1 | 0.032 | 223 |
| 15 | Phosphorus | P | 2.01 | 6.1 | 0.055 | 257 |
| 16 | Sulphur | S | 2.31 | 5.4 | 0.085 | 296 |
| 17 | Chlorine | Cl | 2.62 | 4.7 | 0.137 | 335 |
| 19 | Potassium | K | 3.31 | 3.7 | 0.297 | 424 |
| 20 | Calcium | Ca | 3.69 | 3.4 | 0.428 | 472 |
| 22 | Titanium | Ti | 4.50 | 2.7 | 0.820 | 576 |

When measuring silicone coatings, the energy resolution of the sensor unit 52 is sufficient to eliminate interference from adjacent energy peaks. However, if the base contains any compounds with silicon atoms as a constituent, the measured silicon abundance must be corrected prior to calculating the coat weight.

The most common interfering material in paper bases is kaolinite, common clay, having a composition of $Al_2Si_2O_5(OH)_4$. The silicon contribution due to kaolinite is distinguishable using a linear regression between the silicon and aluminum abundance peaks on a running sample of base stock. A linear correction can the be applied to the silicon abundance peak based upon the height of the aluminum peak. This correction is not valid without further compensation if there are other major sources of either aluminum or silicon. If the composition of such other interfering compounds is known and measurable by the sensor unit 52, the correction can incorporate the further compensation.

Measurement uncertainty or noise associated with the sensor unit 52 includes other effects such as contributions from radiation statistics associated with x-ray generations, detection noise associated with the CCD integrated circuit 12 or 12', electronic noise associated with the analog signal chain 26, and quantization noise associated with generation of an energy histogram of the measurements. The uncertainty related to radiation statistics directly affects the accuracy of the sensor unit 52. The remaining noise sources affect the width of the peaks in the energy histogram. To the extent that the peaks are resolved, integration cancels their effect on the signal. Thus in use of the sensor unit 52 for monitoring silicone coatings, for example, the remaining noise sources are believed to have a negligible effect on the computation of the silicone coat weight once the histogram peaks have been integrated.

The radioactive decay process has Poisson statistics where the probability that any given atom in the source will decay at any given moment is very small. However, the actual output flux is nearly Gaussian in that the source comprises a very large number of atoms. Thus the standard deviation σ is simply related to the number of decay events N by $$\sigma = \sqrt{N}$$

With Gaussian statistics, noise sources are added as the square root of the sum of the squares following $$\sigma_s = \sqrt{\left(\sigma_x \frac{\partial s}{\partial x}\right)^2 + \left(\sigma_y \frac{\partial s}{\partial y}\right)^2 + \left(\sigma_z \frac{\partial s}{\partial z}\right)^2 + \ldots}$$

Relating the fluorescent intensity to the irradiating intensity by $I_{Si}=\gamma_{Si}\mu_{Si}I_0$ and treating only the initial radioactive decay process as Gaussian results in $$\sigma_{Si} = \sqrt{\gamma_{Si}\mu_{Si}I_0}$$

where $\sigma_{Si}$=the silicon abundance standard deviation;

$\gamma_{Si}$=the fluorescence efficiency of silicon;

$\mu_{Si}$=the silicon absorption coefficient; and $I_0$=the nominal incident radiation intensity.

As the source decays, the noise due to radiation statistics increases due to the decreasing number of counts per histogram. The $^{55}$Fe source decays with a half-life of 2.6 years according to the following decay formula $$A = A_0 e^{-\alpha t/\tau}$$

where $A_0$ and A are initial and current activities of the source; α is a proportionality constant of ln 2, approximately 0.693; and t and τ are the half-life and current age of the source.

Given a nominal silicone coating weight and a maximum allowable uncertainty, the useful life of the source is found by substituting the decay formula into that for the silicon abundance standard deviation, whereby $$t = \frac{\tau \ln\left[\frac{A_0 \gamma_{Si} \mu_{Si}}{\sigma^2}\right]}{\alpha}$$

Now defining the variance in terms of percent coat weight with $P_e = 2\sigma/\gamma_{Si}\mu_{Si}I_0$ gives a practical formula for useful life $$t = \frac{\tau \ln\left[\frac{1}{4} A_0 \gamma_{Si}\mu_{Si}P_e^2\right]}{\alpha}$$

For example, from the appendix an initial signal of 2280 counts/sec is calculated for a 1 g/m² coating and a 50 mCi source. Assuming a five second integration period and using the above formula for silicon abundance standard deviation, $\sigma_{Si}$=49, or $P_e$=2.15%. Substituting $P_e$=5% in the formula gives t=1.16 years.

Figure 14:
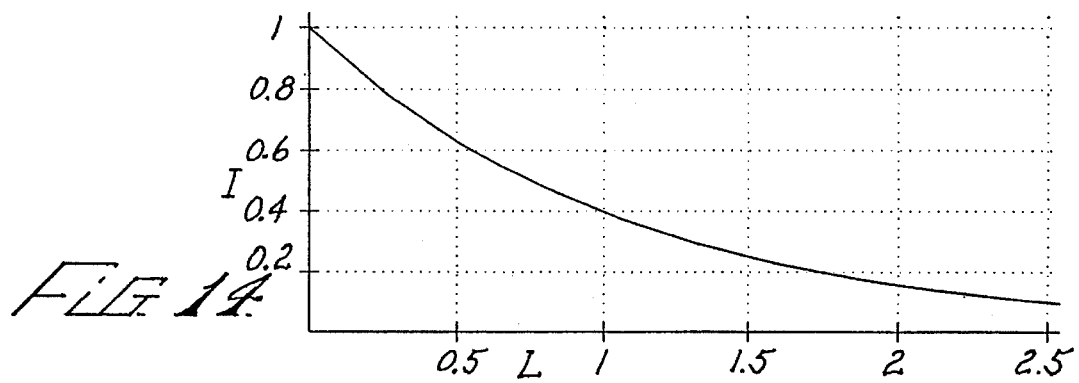
FIG. 14 is a normalized plot of silicon fluorescence vs path line for the sensor of FIG. 7.

Due to the strong absorption in air of the exciting $^{55}$Mn x-rays and the even stronger absorption of the silicon fluorescence x-rays, air gap spacing $D_G$ from the face of the gauge to the sample is critical. Although the optimal distance is zero, practical distances are in the range of 1–5 mm. Within this range, distance fluctuations produce a strong signal modulation. However, the present invention provides compensation for this by measuring the quantity of argon present in the air gap, the quantity being nominally 1% of the matter between the window 60 and the sample 44. Compensation for fluctuations in $D_G$ is effected by evaluating detected signals for silicon and for argon, that for silicon being described as $$I_{Si} = I_0 \sigma_{Si} e^{-(k_{Mn}+k_{Si})D_G}$$

where $I_{Si}$=return signal intensity;

$I_0$=source signal intensity;

$\sigma_{Si}$=silicon fluorescence cross-section;

$k_{Mn}$=linear absorption coefficient in air for $^{55}$Mn $K_\alpha$ x-rays; and $k_{Si}$=linear absorption coefficient in air for Si $K_\alpha$ x-rays.
A normalized plot of $I_{Si}/I_0\sigma_{Si}$ with $k_{Mn}$=0.025/cm and $k_{Si}$=0.90/cm is shown in FIG. 14.

Argon yields a fluorescent $k_\alpha$ x-ray at 2.9 Kev with a quantum efficiency of 11.5%. Thus the detected signal for argon is $$I_{Ar} = \sigma_{Ar} I_0 \int_0^L e^{-(k_{Mn}+k_{Ar})l} dl$$

yielding $$I_{Ar} = \frac{\sigma_{Ar} I_0}{k_{Mn}+k_{Ar}} (1 - e^{-(k_{Mn}+k_{Ar})L})$$

where $I_{Ar}$=return signal intensity;

$I_0$=source signal intensity;

$\sigma_{Ar}$=argon fluorescence cross-section; and $k_{Ar}$=linear absorption coefficient in air for argon $K_\alpha$ x-rays.

Figure 15:
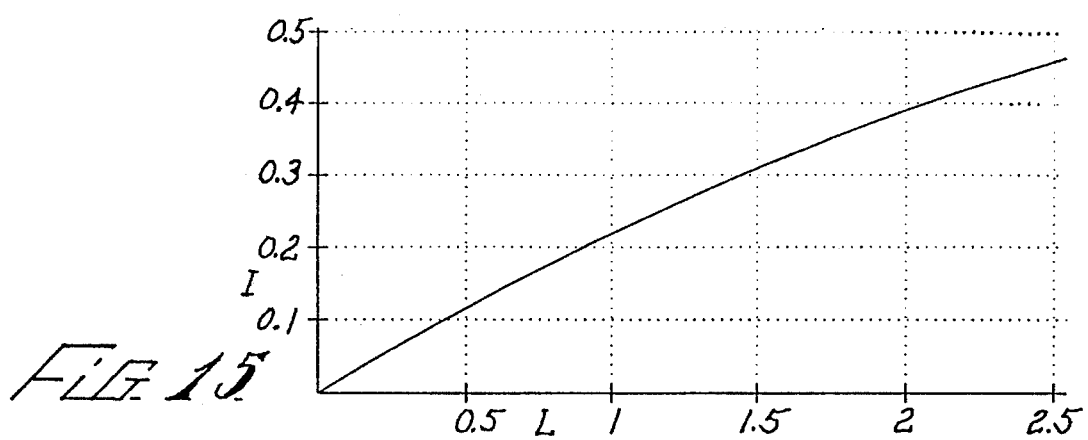
FIG. 15 is a plot of argon fluorescence intensity for air gap path length compensation of the sensor of FIG. 7.

For argon 1% in air, $\sigma_{Ar}$=0.55×10$^{-3}$/cm and $k_{Ar}$=0.22/cm. A normalized plot of $I_{AR}/I_0\sigma_{Ar}$ with the maximum intensity at $L\to\infty$ is shown in FIG. 15.

Using the above description from of signal distribution (see FIG. 11) and assuming a 1 g/m$^2$ silicone coat weight yields a silicon cross-section $\sigma_{Si}$=0.11×10$^{-3}$. This is approximately equivalent to the argon cross-section for an air gap $D_G$ of 2 mm. The argon abundance in the air gap provides a useful basis for correcting for path length variations. Assuming a nominal path line distance of $L_0$ and taking a first-order taylor series expansion of the detected signal for argon about this point yields the linear approximation $$A = e^{-L_0(k_{Mn}+k_{Ar})}[(L-L_0)(k_{Mn}+k_{Ar})-1]+1$$

where A is the normalized argon abundance. Solving for L gives $$L = \frac{(A-1) e^{L_0(k_{Mn}+k_{Ar})}}{k_{Mn}+k_{Ar}} + L_0$$

Using the above formula for the detected signal $I_{Si}$ (see FIG. 14) and the above relation, a path-length normalized silicone reading can be calculated from $$I_{Si} = I_M \beta^{(1-A)-L_0}$$

where $I_M$ is the measured silicone abundance and $\beta$ is the argon slope about the nominal path line distance $L_0$, $$\beta = \frac{e^{L_0(k_{Mn}+k_{Ar})}}{k_{Mn}+k_{Ar}}$$

Correction of the silicone abundance in this manner will increase the standard deviation of the measurement. An explicit prediction can be found by applying the square root of the sum of the squares to the path-length normalized silicone reading $I_{Si}$ and combining the silicon abundance standard deviation $\sigma_{Si}$ along with the return signal intensity for argon $I_{Ar}$. For argon abundances on the order of silicon abundances, a much simpler result can be obtained by first making the intuitive approximation $$\sigma_{Ar} = \sigma_{Si}\sqrt{\frac{L_=}{L_0}}$$

where $\sigma_{Ar}$=expected standard deviation for argon abundance;

$\sigma_{Si}$=expected standard deviation for silicon abundance;

$L_=$=path line distance for which abundances are equal; and $L_0$=the nominal path line distance.

Using the square-root of the sum of the squares and assuming $I_{Ar}=I_{Si}(L_0/L_=)$, the $\sigma$ for the composite measurement reduces to $$\sigma = \sigma_{Si}\sqrt{1+\left(\frac{L_=}{L_0}\right)}$$

For example, for $L_=$=2 mm and $L_0$=5 mm, $\sigma$ is 1.2 times $\sigma_{Si}$. A review of FIG. 14 shows that any fluctuation in the air gap distance $D_s$ would result in a much larger variance, thus confirming the validity of using the argon abundance as a correction factor.

Figure 16:
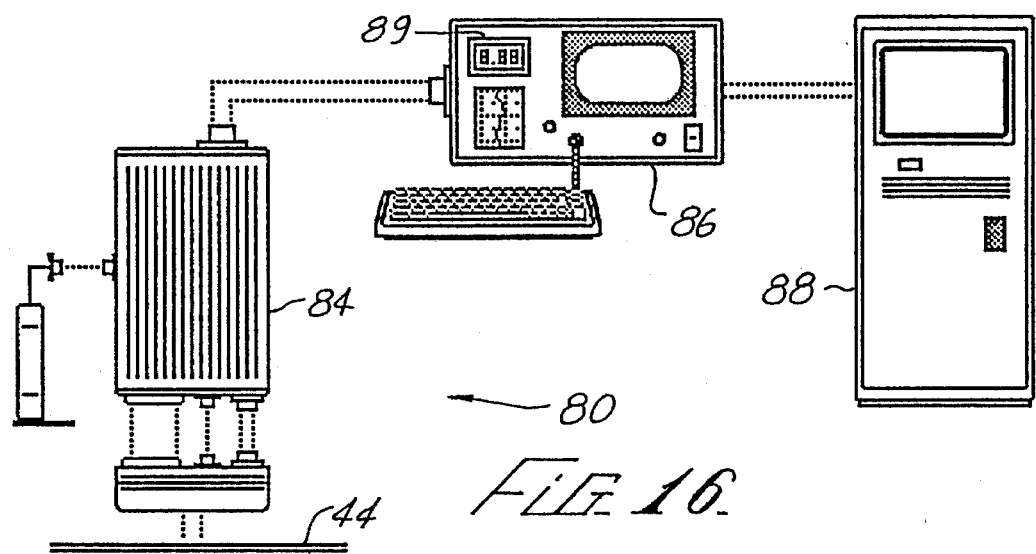
FIG. 16 is a pictorial block diagram of a coating thickness measurement apparatus incorporating the sensor of FIG. 9.

With further references to FIGS. 16–21, a practical embodiment of the present invention includes the spectrometer 40 having the sensor unit 52 in a coating thickness measurement apparatus 80. The measuring apparatus 80 includes three primary modules, a sensor head 82 incorporating the sensor unit 52, a processor module 84, and a display module 86, connected as shown in FIG. 16, the display module 86 also being connected to a display 88.

Figure 17:
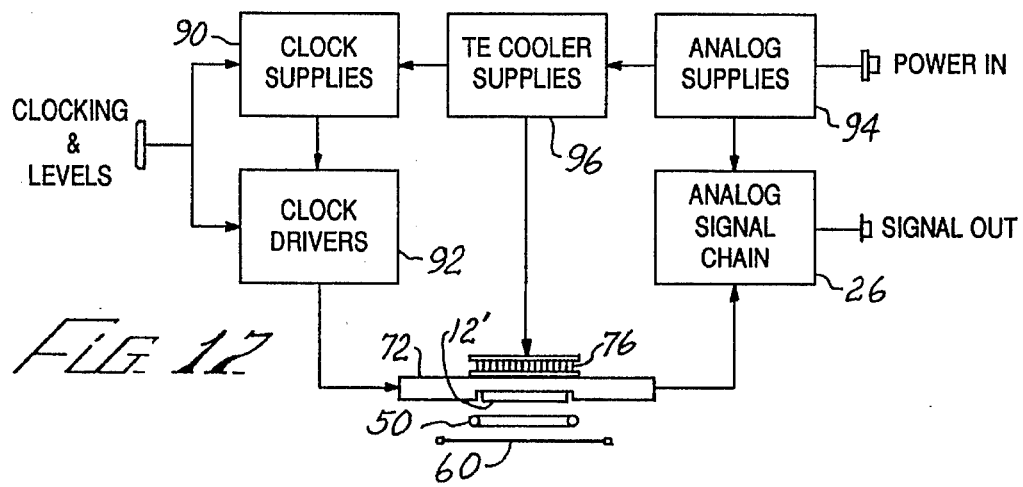
FIG. 17 is a pictorial block diagram of a sensor head portion of the apparatus of FIG. 16.

The sensor head 82 includes the sensor unit 52 in the thermoelectrically cooled configuration of FIG. 9, the analog signal chain 26, and associated electronics. As shown in FIG. 17, the sensor head 82 is driven by a set of clocking signals and voltage references from the processor module and outputs an analog data stream of CCD pixel levels from the analog signal chain 26. Thus the clock 22° is implemented partially in the processor module 84, the sensor head 82 having clock supplies 90 and clock drivers 92 that are connected to the CCD integrated circuit 12'. The sensor head 82 further includes analog supplies 94 for the analog signal chain 26, and thermoelectric cooler supplies 96 for the coolers 76.

Figure 18:
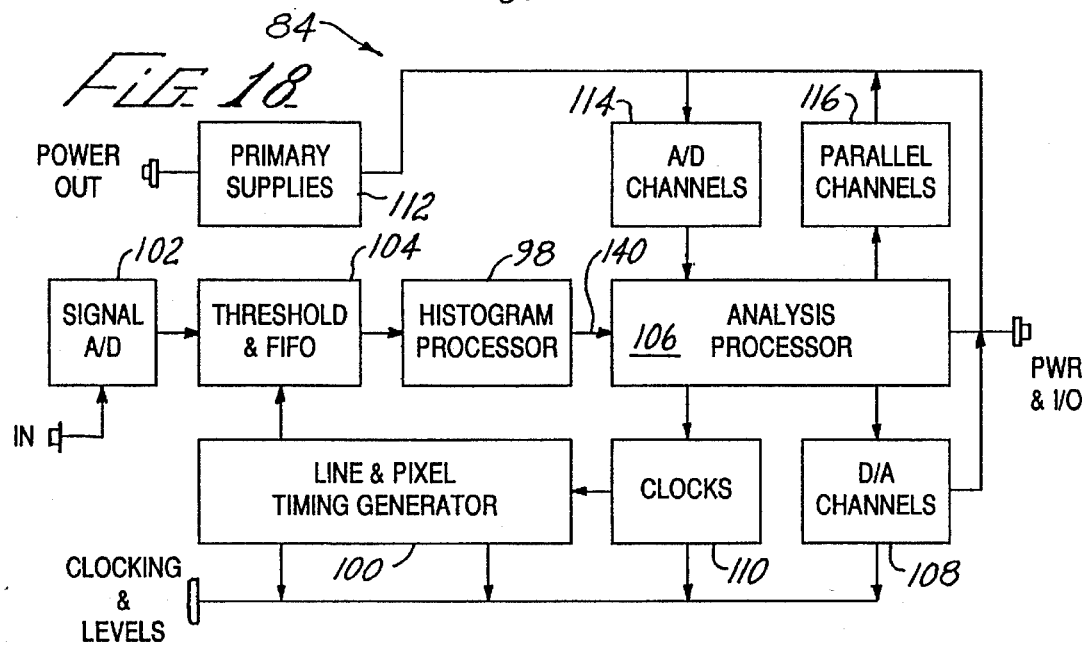
FIG. 18 is block diagram of a processor portion of the apparatus of FIG. 16.

The processor module 84 generates the clocking signals required by the CCD detector integrated circuit 12', monitors the thermoelectric coolers 76, and processes the analog data stream from the sensor head 82 for determining the abundance of low-Z elements present. As shown in FIG. 18, the processor module 84 includes a histogram processor 98 that is responsive to the analog signal from the sensor head 82 and to a line and pixel generator 100, the analog signal being fed to an analog to digital converter 102 and a threshold and first-in-first-out (FIFO) buffer 104. The histogram processor 98 delivers a histogram in the form of the frequencies of occurrence of events within predetermined energy bands to an analysis processor 106, the analysis processor 106 also driving digital to analog channels 108 and clocks 110 for supplying, together with the timing generator 100, clock timing and levels to the sensor head 82. The processor module 84 further includes primary power supplies 112 for the sensor head 82 that are monitored by the analysis processor 106 by means of an analog to digital channel 114, control being effected through parallel channels 116. The output from the processor module 84 is a digital data stream from the analysis processor 106 and a programmable analog channel from the D/A channels 108. Reference voltages are converted to clocking levels by the clock supplies 90 and then applied to the CCD integrated circuit 12' of the sensor head 82 by the clock drivers 92.

As discussed above, the analog signal chain 26 is included within the sensor head 82, the analog output thereof feeding the analog to digital converter 102 within the processor module 84. Alternatively, the converter 102 can be in the sensor head 82. Further, a portion of the analog signal chain 26 can be an included part of the processor module 84, the output from the on-chip CCD output amplifier 20 being amplified by the low-noise preamplifier 28, and then sent to the processor module 84 for correlated double-sampling by the clamp amplifier 32, the clamp switch 34, and the sample switch 36, followed by digital conversion in the A/D converter 102.

Figure 19:
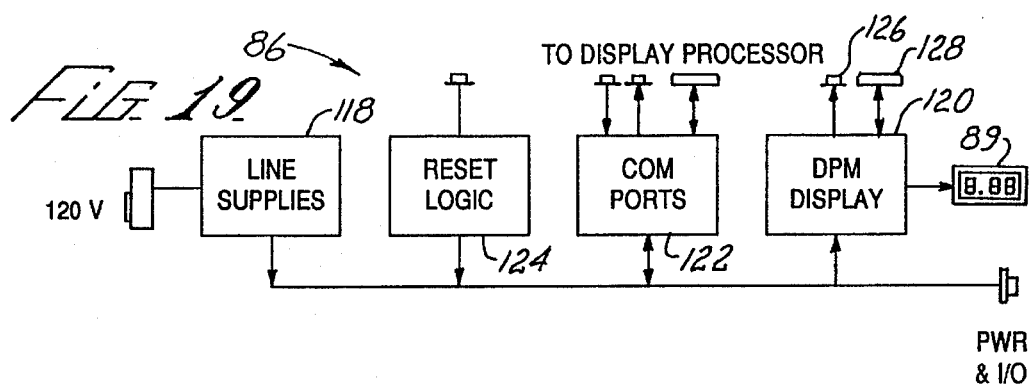
FIG. 19 is a block diagram of an interface module portion of the apparatus of FIG. 16.
Figure 20:
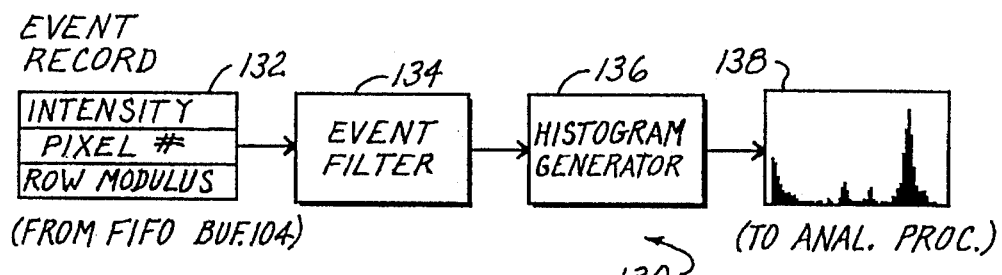
FIG. 20 is a histogram processor block diagram of the processor portion of FIG. 18.

As shown in FIG. 19, the display module 86 contains a low-voltage off-line supply 118, a digital panel meter display driver 120 for driving a digital display 89, and communication ports 122 providing interface electronics to another display system. Reset logic 124 is also included for setting the system into a known state upon initial start-up.

Exemplary communication ports 122 comprise a full-duplex RS-232 DCE serial channel operating to 19.2 Kbaud, a half-duplex RS-232 DTE logging channel paralleling the DCE channel, and a full-duplex 75Ω coax high speed link. The DPM display driver 120 converts the D/A current output of the processor module 84 to a simultaneous digital representation on the digital display 89, a frequency output 126, and a RS-232 DTE logging channel 128 at up to 9600 baud.

As described above, the CCD integrated circuit 12' is operated in a "time-delay and integrate" mode, not a conventional "frame-transfer" mode. In the frame transfer mode, after a given exposure time, the sensor unit 52 would be shuttered closed and the collected charge read out, then the shutter opened and the cycle repeated. In the time-delay and integrate (TDI) mode there is no shutter. Instead, read-out occurs continuously and the exposure time is equal to the product of the number of the rows 16R and the period of the parallel transfer signals $\phi_P$ from the clock 22'. In conventional imaging, operation in the TDI mode would produce smearing of the image. As no imaging is required in the measuring apparatus 80, there is no need for a shutter.

Software in the processor module 84 runs concurrently on the histogram processor 98 and the analysis processor 106. A suitable device for use as the histogram processor 98 is an Inmos T425 transputer (32 bit integer processor), available from Inmos Limited of Bristol, UK. The processor 98, programmed as diagrammed in FIG. 20, executes a process 130 for performing event filtering and histogram generation as described below.

A first stage of pixel event filtering is performed by hardware, in the FIFO buffer 104. Any pixel events that are below a software-set threshold value are discarded. Events above the threshold are received by the histogram processor 98 in an event recording step 132 of the histogram process 130. The information set for each event includes amplitude, relative CCD line number, and pixel number within the line.

The histogram process 130 also includes an event filter 134, wherein a second stage of event filtering is performed for combining split-pixel events having the charge generated by the absorption of an x-ray photon spread over more than one pixel. Before a pixel event is used in an energy histogram, the event filter 134 checks for additional events in adjacent pixels. This is done by treating a particular event as a base event in a base pixel and searching for other events in pixels within a filter window that is referenced to the base pixel. In an exemplary embodiment of the event filter 134, the reference window is rectangular, being a three by three pixel window surrounding the event. Thus the base pixel is the central pixel of the reference window, the reference window moving relative to a stored array of event data within the histogram processor 98. If a second event is found within the reference window, the second event is normally summed with the base event and tabulated as one event in a hardware FIFO register of the histogram processor, whereby a pair of nearest-neighbor events are treated as having been produced by a single x-ray photon. In the exemplary implementation of the event filter 134, a further test is made for determining the occurrence of events in multiply adjacent pixels wherein energy may have been spread across more than two pixels. It is believed that the likelihood of events in multiply adjacent pixels results from singular photons is doubtful, particularly in that the events processed by the event filter 134 have not been excluded by threshold detection in the FIFO buffer. Accordingly, events in multiply adjacent pixels are discarded.

It will be understood that as each event is processed by the event filter 134, every event is considered once and only once as a base event and may also be found as an adjacent event.

Event records from the hardware FIFO of the event filter 134 are accumulated in a histogram generate step 136 for forming an energy histogram record 138. After an integration interval, this histogram record 138 is transmitted to the analysis processor 106 for calculating elemental abundances. In an exemplary configuration of the processor module 84, software for the histogram processor 98, including the histogram process 130, is dynamically downloaded upon power-up from a code image stored in the analysis processor 106.

The histogram record 138 created from the filtered pixel events consists of a vector of the accumulated number of events detected for different energy levels during the specified integration time. After the integration time, this vector is transmitted over a high speed serial link 140 to the analysis processor.

Figure 21:
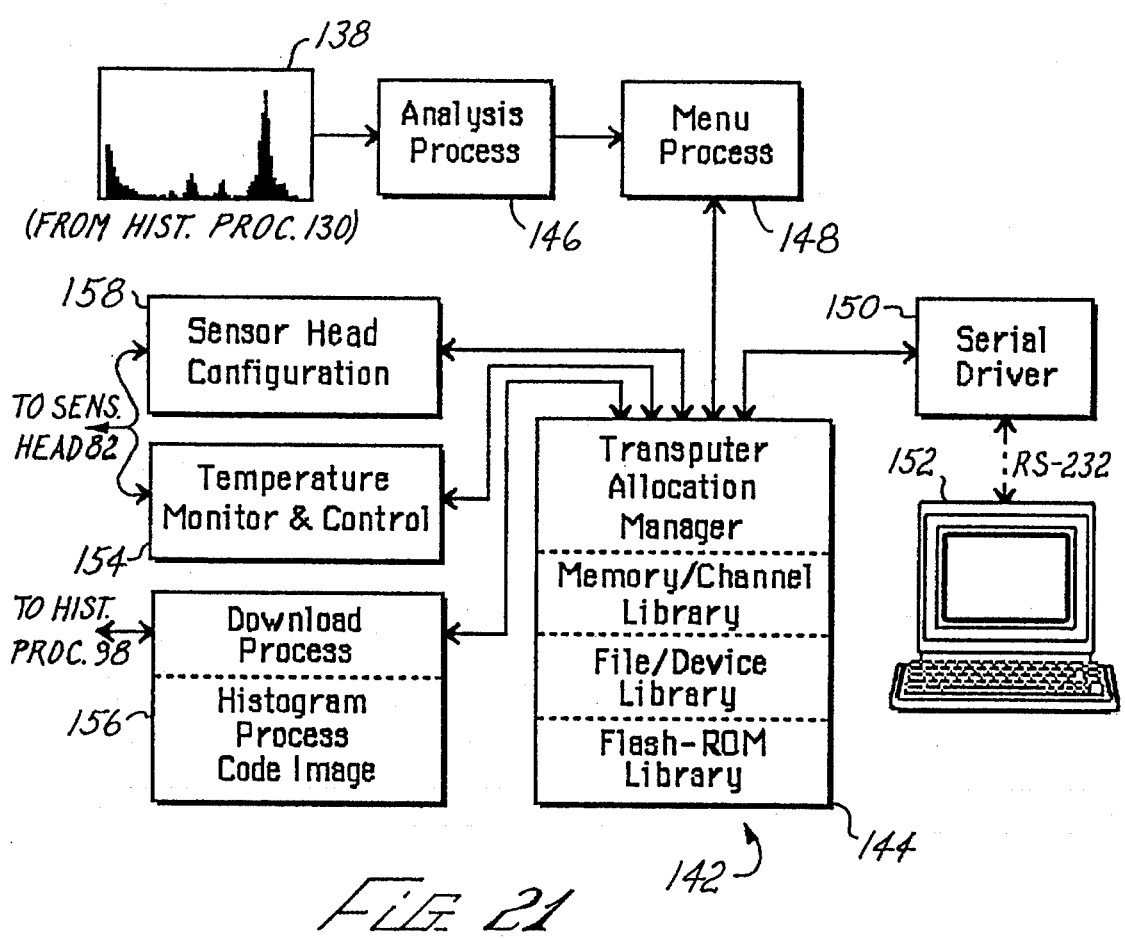
FIG. 21 is an analysis processor block diagram of the processor portion of FIG. 18.

As shown in FIG. 21, the analysis processor 106 is programmed with an analysis manager 142, receiving the energy histogram record 138 and communicating with the sensor head 82 and the histogram processor 98. In the exemplary configuration of the measuring apparatus 80 described herein the analysis processor 106 is an Inmos T800 Transputer (32 bit floating-point), also available from Inmos Limited. The software of the analysis manager 142 executes as a set of concurrent processes running under a transputer allocation manager (TAM) operating kernel 144. In a development environment software is downloaded from a development system (not shown) after power-on or a system reset, whereas in a stand-alone environment the software is automatically copied from an image in read only memory.

The analysis manager 142 includes an analysis process 146 for receiving the histogram record 138 and computing a sample element abundance such a silicone coating weight per unit of area of the sample 44. A menu process 148 of the manager 142 accepts user parameters and options and displays the computed elemental abundances. The analysis process 146 is based upon the intensity ratios of x-ray events at specific energy bands from the source 50 and the fluorescence of material of the sample 44. Internal calibration of the analysis process 146 is performed using the high intensity, high energy peak expected from the $^{55}$Mn $K_\alpha$ emission.

The intensity of the exemplary silicon line is the $^{55}$Mn $K_\alpha$ and $K_\beta$ escape peaks in the silicon CCD sensor. The contribution due to the escape peaks is subtracted as a fixed ratio of the $^{55}$Mn $K_\alpha$ intensity. This ratio is calculated during head calibration with no sample present. The contribution due to clays is subtracted as a ratio of the measured aluminum intensity. This ratio is calculated during base calibration, during which base stock without silicone coating is measured. The residual after subtraction of these two contributions is assumed to be due to the silicon atoms present in the silicone polymer.

The analysis manager optionally provides a serial driver 150 for interfacing to a standard RS-232 protocol device 152, such as an ASCII display terminal; otherwise, communications are assumed to be over a transputer serial link to a TAM device-server application executing on a development system. The analysis manager further includes a temperature monitor and control process 154 for driving the thermoelectric coolers 76 for the CCD integrated circuit 12' from the parallel channels 116 by comparing measured temperatures as communicated through the A/D channels 114 to predetermined setpoints. A download process 156 downloads a code image of the histogram process 130 to the histogram processor 98 and initiates execution of the process 130 therein. A sensor configure process 158 sets CCD timing and voltage parameters and allows a user to display and modify these parameters.

In setting up and calibrating the measuring apparatus 80, internal calibration is performed for obtaining "zero" reference levels for silicon and aluminum abundances and the maximum argon abundance. The internal calibration is performed as a process of acquiring a reference energy histogram with no sample present.

Background analysis is next performed as a calibration procedure wherein un-coated base is run in the path of the sample 44 at the nominal air gap spacing $D_G$. During this procedure, low-Z elemental abundances are acquired and a multiple-linear regression performed upon the major peaks. For the regression to be valid base stock must be moving across the gauge aperture during calibration.

The silicone coat weight computed in the analysis process 146 includes a net analysis, which may proceed with or without a prior net calibration procedure. In the net calibration procedure, the sample 44 in the form of coated stock is measured by the apparatus 80. If a calibration procedure is not used, an absorption coefficient based upon the percent silicon atoms in the silicone resin is used to calculate a net multiplier.

The net calibration procedure is best performed with a static (stationary) counterpart of the sample 44, the measurement apparatus set to read the same coat weight as another gauge used as a reference. The base calibration should be executed before running the net calibration procedure.

During net analysis, the measured silicon abundance is corrected first by the linear factors computed during base calibration and then using the argon abundance for compensating for path line variations. The final abundance is then converted to engineering units by a net multiplier calculated during net calibration and displayed.

Although the present invention has been described in considerable detail with reference to certain preferred versions thereof, other versions are possible. For example, alternative microprocessors such as those manufactured by Motorola Corp. or Intel Corp. may be applied. Therefore, the spirit and scope of the appended claims should not necessarily be limited to the description of the preferred versions contained herein.

What is claimed is:

1. An energy-resolving x-ray detector comprising:
   (a) a charge-coupled integrated circuit radiation detector device having:
      (i) an array of collection regions, each of the collection regions having an associated transport electrode, the collection regions being located for receiving soft x-rays from source external of the detector device and forming at least one collection shift register; and
      (ii) an output amplifier for sequentially amplifying and signalling the charges received by the collection shift register; and
   (b) a clock circuit connected to the transport electrodes for sequentially shifting charges between collection regions of the collection shift register and into the output amplifier during continuous exposure of the array to incoming radiation, each of the charges received by the output amplifier being sequentially accumulated in each of the collection regions of the collection shift register in response to the radiation, the clocking being at a rate that is effective for determining energy levels of single-photon x-ray events.

2. The detector of claim 1, wherein the detector device comprises a parallel plurality of the collection shift registers, each collection shift register forming a column of the array, corresponding collection regions of the collection shift registers forming rows of the array.

3. The detector of claim 2, wherein the detector device further comprises a row shift register connected between the collection shift registers and the output amplifier, the row shift register having cell regions and associated transport electrodes, the transport electrodes of the row shift register being connected to the clock circuit, the clock circuit being operative for periodically shifting the charges from each of the collection shift registers into a corresponding element of the row shift register, and for sequentially shifting the charges from the row shift register to the output amplifier.

4. The detector of claim 3, wherein the clock circuit has a multi-phase row output for driving the transport electrodes of the row shift register, and a multi-phase column output for driving the transport electrodes of the collection shift registers.

5. The detector of claim 1, wherein the array is formed in a substrate having a total thickness T within a region occupied by the array, the thickness T being not greater than approximately 20 μm for admitting the soft x-rays.

6. An energy-resolving x-ray detector comprising:
   (a) a charge-coupled integrated circuit radiation detector device having:
      (i) an array of collection regions, each of the collection regions having an associated transport electrode, the collection regions forming at least one collection shift register; and
      (ii) an output amplifier for sequentially amplifying and signalling the charges received by the collection shift register; and (b) a clock circuit connected to the transport electrodes for sequentially shifting charges between collection regions of the collection shift register and into the output amplifier during continuous exposure of the array to incoming radiation, each of the charges received by the output amplifier being sequentially accumulated in each of the collection regions of the collection shift register in response to the radiation, the output amplifier having a reset connection to the clock circuit for momentarily resetting the input to the output amplifier at a predetermined level prior to receipt of each of the charges into the output amplifier.

7. The detector of claim 6, further comprising a correlated double sampling signal chain responsive to the output amplifier and the clock circuit for generating an analog sample signal for each charge received into the output amplifier, the analog sample signal being proportional to the energy of the incoming radiation having reached successive collection regions of the collection shift register during accumulation of the received charge.

8. An x-ray spectrometer comprising:
 (a) an energy-resolving x-ray detector comprising:
  (i) a charge-coupled integrated circuit radiation detector device having an array of collection regions, each of the collection regions having an associated transport electrode, the collection regions forming at least one collection shift register; and an output amplifier for sequentially amplifying and signalling the charges received by the collection shift register; and
  (ii) a clodck circuit connected to the transport electrodes for sequentially shifting charges between collection regions of the collection shift register and into the output amplifier during continuous exposure of the array to incoming radiation, each of the charges received by the output amplifier being sequentially accumulated in each of the collection regions of the collection shift register in response to the radiation; and
 (b) a source of x-ray radiation for producing x-ray fluorescence of a sample, the detector being responsive to the fluorescence of the sample.

9. The spectrometer of claim 7, wherein the source of x-ray radiation is a radioactive material.

10. The spectrometer of claim 9 wherein the radioactive material forms an annular member surrounding a radiation path between the sample and the detector device.

11. The spectrometer of claim 10 wherein the array of collection regions is planar, the annular member being supported parallel to the array, being axially spaced from the array not more than approximately 25% of a path length between the sample and the array for enhancing a field of view from the array to the sample.

12. The spectrometer of claim 9 wherein the radioactive material comprises iron-55.

13. The spectrometer of claim 8, wherein the source of x-ray radiation is an x-ray tube.

14. The spectrometer of claim 8, further comprising a histogram generator for recording a relative frequency of events within predetermined energy ranges in response to the output amplifier of the detector device.

15. The spectrometer of claim 14, further comprising an event filter connected between the output amplifier and the histogram generator, the event filter comprising:
 (a) a threshold detector for identifying as events received charges having at least a predetermined magnitude;
 (b) an event correlator for determining the occurrence of correlated events in adjacent collection regions of the detector device; and
 (c) an integrator for combining as a single event the magnitudes of the correlated events.

16. The spectrometer of claim 15, wherein the event filter further comprises:
 (a) an event discriminator connected between the threshold detector and the correlator for determining the occurrence of unresolvable events in adjacent collection regions of the detector device; and
 (b) a gate for excluding as events the unresolvable events.

17. The spectrometer of claim 16, wherein the event discriminator includes a magnitude comparator.

18. The spectrometer of claim 16, wherein the adjacent collection regions are within a moving rectangular discrimination window array, a base element of the window array corresponding to a collection region of the detector device from which an event is detected.

19. The spectrometer of claim 18, wherein the window array is a 3 by 3 array, a center element of the array being the base element.

20. A coating thickness gauge comprising the spectrometer of claim 8, in combination with an analysis processor, the analysis processor receiving intensity ratios within predetermined energy bands from the spectrometer, the processor subtracting a base calibration value from the intensity of an energy band associated with a material being measured for producing a corrected abundance, the processor applying a net multiplier to the corrected abundance for generating a net coating thickness.

21. An energy-resolving x-ray detector comprising:
 (a) a charge-coupled integrated circuit radiation detector device having:
  (i) an array of collection regions, each of the collection regions having an associated transport electrode, the collection regions forming a parallel plurality of collection shift registers, each collection shift register forming a column of the array, corresponding collection regions of the collection shift registers forming rows of the array;
  (ii) an output amplifier for sequentially amplifying and signalling the charges received by the collection shift registers; and
  (iii) a row shift register connected between the collection shift registers and the output amplifier, the row shift register having cell regions and associated transport electrodes;
 (b) a clock circuit having a multi-phase column output connected for driving the transport electrodes of the collection regions for sequentially shifting charges between collection regions of the collection shift registers and into the row shift register during continuous exposure of the array to incoming radiation, each of the charges received by the output amplifier being sequentially accumulated in each of the collection regions of one collection shift register in response to the radiation, the clock circuit also having a multi-phase row output connected for driving the transport electrodes of the row shift register for sequentially shifting the charges from the row shift register to the output amplifier, the output amplifier having a reset connection to the clock circuit for momentarily resetting the input to the output amplifier at a predetermined level prior to receipt of each of the charges into the output amplifier.

22. An x-ray spectrometer comprising the detector of claim 21 in combination with a source of iron-55 radioactive material for producing x-ray fluorescence of a sample, the radioactive material forming an annular member surrounding a radiation path between the sample and the detector device, the detector being responsive to the fluorescence of the sample, the spectrometer further comprising:

(a) a histogram generator for recording a relative frequency of events within predetermined energy ranges in response to the output amplifier of the detector device; and (b) an event filter connected between the output amplifier and the histogram generator, the event filter comprising:

(i) a threshold detector for identifying as events received charges having at least a predetermined magnitude;

(ii) an event correlator for determining the occurrence of correlated events in adjacent collection regions of the detector device; and (iii) an integrator for combining as a single event the magnitudes of the correlated events.

23. A method for detecting energy levels of x-ray radiation, comprising the steps of:

(a) providing an array of radiation collection regions and associated transport electrodes in a charge-coupled integrated circuit;

(b) continuously exposing the array to x-ray radiation;

(c) biasing the electrodes for the collection of electron charges in the collection regions in response to the x-ray radiation;

(d) coupling an output amplifier to the array; and (e) clocking the transport electrodes for sequentially shifting the collecting charges to an input of the output amplifier, the output amplifier signalling the energy levels of the x-ray radiation.

24. A method for energy-resolving soft x-rays, comprising the steps of:

(a) providing a charge-coupled integrated circuit radiation detector device having an array of collection regions, each of the collection regions having an associated transport electrode, the collection regions forming at least one collection shift register;

(b) locating the array for receiving soft x-rays from a source external of the detector device;

(c) clocking the transport electrodes for sequentially shifting charges between collection regions of the collection shift register during continuous exposure of the array to incoming radiation, each of the charges being sequentially accumulated in each of the collection regions of the collection shift register in response to the radiation; and (d) sequentially receiving and amplifying the charges from the shift register during the clocking, the clocking being at a rate that is effective for determining energy levels of single-photon x-ray events.

* * * * *